US006347809B1

(12) United States Patent
Mack

(10) Patent No.: US 6,347,809 B1
(45) Date of Patent: Feb. 19, 2002

(54) STABILIZER FOR FLEXIBLE BRUSHES AND FLAPS

(76) Inventor: David L. Mack, 3231 Chanute Dr., Lake Havasu City, AZ (US) 86406

( * ) Notice: Subject to any disclaimer, the term of this patent is extended or adjusted under 35 U.S.C. 154(b) by 0 days.

(21) Appl. No.: 09/664,452

(22) Filed: Sep. 18, 2000

Related U.S. Application Data

(60) Provisional application No. 60/156,437, filed on Sep. 28, 1999.

(51) Int. Cl.$^7$ ............................. B62B 9/14; B62D 25/18
(52) U.S. Cl. ....................... 280/847; 280/851; 280/848; 280/154
(58) Field of Search ................................. 280/847, 770, 280/848, 849, 851, 159, 154

(56) References Cited

U.S. PATENT DOCUMENTS

| | | | | |
|---|---|---|---|---|
| 1,579,623 A | * | 4/1926 | Atherton | 280/851 |
| 1,962,536 A | * | 6/1934 | Thoen | 280/160 |
| 2,782,053 A | * | 2/1957 | Long | 280/851 |
| 2,826,428 A | * | 3/1958 | Lincoln | 280/851 |
| 3,059,945 A | * | 10/1962 | Robb | 280/851 |
| 3,088,751 A | * | 5/1963 | Barry et al. | 280/851 |
| 3,091,478 A | * | 5/1963 | Ambli | 280/851 |
| 3,244,432 A | * | 4/1966 | Ambli | 280/851 |
| 3,794,383 A | * | 2/1974 | France et al. | 280/851 |
| 3,830,520 A | | 8/1974 | Kelly | |
| 3,877,722 A | | 4/1975 | Conner | |
| 4,053,172 A | * | 10/1977 | McClure | 280/163 |
| 4,413,839 A | | 11/1983 | McCain | |
| 4,572,532 A | | 2/1986 | Early et al. | |
| D308,958 S | | 7/1990 | Knox | |
| 5,050,908 A | | 9/1991 | Betts | |
| 5,181,734 A | | 1/1993 | Brown | |
| 5,816,617 A | | 10/1998 | Huang | |

FOREIGN PATENT DOCUMENTS

GB    2269349    2/1994

* cited by examiner

Primary Examiner—Brian L. Johnson
Assistant Examiner—Joselynn Y. Sliteris
(74) Attorney, Agent, or Firm—Richard C. Litman

(57) ABSTRACT

A stabilizer for flexible guards provides for the stabilization and control of flexible flaps, brush type devices, and the like as used in motor vehicle mud flaps, car washes, and in conveyor systems. The present stabilizer includes a rigid structure which completely surrounds the guard(s), and which is loosely and flexibly suspended from an overlying structure. The rigid portion of the device is preferably constructed of polyvinyl chloride (PVC) pipe or tubing, or any other suitable elongate structural material (e.g., electrical metal tubing, pipe, and/or extruded metallic or non-metallic shapes, such as Tees, channels, angles, etc.). The rigid structure is preferably suspended from the overlying structure by chains at at least both ends of the device, with an additional chain(s) optionally installed at the center area of the device. The chains (or other suitably flexible attachments) provide longitudinal, lateral, and vertical movement or compliance in the event the stabilizer or stabilized guard strikes or is struck by another object, thus precluding damage to the stabilizer and/or transfer of the impact and resulting damage to the vehicle or attachment structure. The rigid portion of the device which surrounds the guard, may be weighted in order to adjust the periodic frequency of the suspended assembly, to avoid any resonant frequencies with the guard with which the device is installed. Width adjustment may be provided by forming the elongate lateral members of telescoping components.

15 Claims, 8 Drawing Sheets

STABILIZER FOR FLEXIBLE BRUSHES AND FLAPS

REFERENCE TO RELATED PATENT APPLICATION

This application claims the benefit of U.S. Provisional Patent Application Ser. No. 60/156,437, filed on Sep. 28, 1999.

BACKGROUND OF THE INVENTION

1. Field of the Invention

The present invention relates generally to flexible brushes, flaps, and the like for preventing or reducing scatter of loose materials and/or wiping down an object over which they pass, and more specifically to a stabilizer bar for such devices. The present stabilizer bar is adaptable to mud guards and the like on the rear of motor vehicles, as well as to brushes and flaps used in car washes, conveyor systems, etc., to stabilize such devices and to prevent excessive movement of the devices.

2. Description of the Related Art

The use of relatively thin, flexible sheet or strand materials depending from an overhead structure for catching scattered materials, is well known. Perhaps the most commonly known of such devices is the "mud flap" which is nearly universally found behind the rear tires on larger vehicles (buses, trucks, etc.) for reducing or precluding the scatter of sand, small stones, water spray, etc. from the rear tires of such vehicles.

However, such flexible flaps, brushes, and the like are also used in other environments for slightly different purposes. Flexible fabric flaps are often found in so-called "brushless" car washes, where they are used in lieu of relatively stiff fiber rotary brushes, and are considered to be easier on vehicle finishes. Relatively large flaps, as well as brushes and the like, are also used in the conveyor industry for brushing off a conveyor or for precluding the carriage of undesirable articles beyond the brush or flap installation.

A potential problem which all such brush and flap installations have, is that they are prone to move about excessively due to their flexibility. For example, the relative wind produced as a result of motor vehicle movement, often causes mud flaps or stone guards to flex upwardly to the extent that they allow debris to be sprayed upwardly and rearwardly toward following vehicles. Such action can potentially lead to windshield and paint damage to a following vehicle, and is especially hard on a vehicle which is being towed closely behind the larger vehicle, as in the case of a large recreational vehicle or motor home which is towing a smaller car, boat, etc. Flexible flaps in car washes are also prone to excessive movement due to air movement caused by relatively high velocity sprays and blow dryers, and flexible guards and flaps used in conveyor lines may also catch upon an article or be flipped up momentarily, thus causing them to lose contact with the conveyor for at least a brief time.

Many people have recognized these problems in the past, and have attempted to provide solutions in the form of various guards, stabilizing devices, etc. to reduce excessive movement of such flexible brushes, flaps, and the like. However, for various reasons, the stabilizing devices of the prior art have not proven to be completely satisfactory in reducing movement of such flexible guards. In most instances, they fail to completely surround the guard, thus allowing the guard to flex forwardly excessively, or perhaps comprise a rigid structure which cannot flex or move without damage in the event the device contacts an immovable object (e.g., high curb or parking lot wheel stop, edge of deep potholes, etc.).

Accordingly, a need will be seen for a stabilizer for reducing or precluding excessive movement of flexible brush and flap type guards of various types. The present stabilizer completely surrounds the flexible guard device, to reduce or preclude excessive movement either forwardly or rearwardly relative to the direction of travel of the guard or adjacent moving object. The present stabilizer also includes a novel suspension system, allowing the stabilizer device to move longitudinally, laterally, and/or vertically in the event of contact with another relatively immovable object, thus precluding damage to the stabilizer and/or to the structure to which the stabilizer is attached.

A discussion of the related art of which the present inventor is aware, and its differences and distinctions from the present invention, is provided below.

U.S. Pat. No. 3,830,520 issued on Aug. 20, 1974 to John J. Kelly, titled "Combined Mud Flap And Stabilizer Therefor," describes a cable type stabilizer attached at both ends to the attachment bracket for the mud flap (not to the vehicle structure, as in the case of the present stabilizer) and secured to the back of the mud flap in a U shaped configuration. The Kelly device is not adaptable to brush type guards comprising multiple small strands of material, due to the attachment means. Kelly provides for vertical adjustment of his stabilizer, but such adjustment is cumbersome, as a series of cable clamps must be loosened for the length of the cable to be adjusted as desired. It must also be noted that the Kelly specifies the diameter of the cable as being from one quarter to five eighths inch (column 2, lines 44–45). Even the smaller diameter cable is not particularly flexible, and would not readily flex to allow for compression in the event the flap were jammed upwardly by a curb or the like. Also, the Kelly stabilizer attaches only to the back of the flap, rather than loosely surrounding the guard, as in the present invention.

U.S. Pat. No. 3,877,722 issued on Apr. 15, 1975 to Harold V. Conner, titled "Mud Flap Apparatus For Trucks," describes a mud flap assembly having an inflexible strap extending down the back of each flap and secured thereto, thus rendering the flaps inflexible. While the straps are pivotally attached to the mud flap carrier, they cannot bend or compress when encountering a solid object, as can the present stabilizer. Moreover, the present stabilizer is not attached directly to the mud guard, as is the Conner device.

U.S. Pat. No. 4,413,839 issued on Nov. 8, 1983 to Thomas S. McCain, titled "Mud Flap Stabilizer Device," describes a complex assembly including lighting means mounted in a lower pivotally attached portion. The upper portion is rigidly mounted to the vehicle structure, unlike the present stabilizer assembly, with only the lower portion being pivotally mounted. However, the motion of the pivotally mounted lower portion is extremely limited, to only about fifteen to twenty degrees rearwardly and even less forwardly (column 3, line 29). Contact with a curb during backing maneuvers would likely damage the device, resulting in costly repairs due to its complexity. The flexible mounting of the present stabilizer, allowing longitudinal, lateral, and vertical motion, allows inadvertent contact with immovable objects with no damage resulting to the vehicle, mud guard, or stabilizer.

U.S. Pat. No. 4,572,532 issued on Feb. 25, 1986 to William C. Early et al., titled "Mud Flap Holder For Trucks," describes a clamp arrangement for removably securing the upper edge(s) of the mud flap(s) to the rear of a truck trailer or the like. The holder includes rigid rod elements which extend downwardly behind the flaps and extend partially across the flaps, with secondary elements which may be installed to the opposite (front) side of the flaps and which extend partially over the opposite portion of the flaps. The rod elements allow flexure of the mud flaps only beyond their extremities, and the same potential problems of rigid mud guard stabilizers or retainers noted above with other devices, are seen to apply here as well.

U.S. Pat. No. 5,050,908 issued on Sep. 24, 1991 to William M. Betts, titled "Mud Flap Anti-Sail Bracket," describes a pair of rigidly mounted rods which extend downwardly in front of each edge of a mud flap and slightly below the bottom edge thereof. The rods have upturned portions to which a crossmember may be adjustably clamped, with the crossmember extending across the back of the mud flap. However, the crossmember does not completely surround the mud flap, whereas the present stabilizer does. The rigid mounting of the Betts bracket does not provide any compliance or resilience if struck, and would thus be damaged, or transfer damage to the structure to which it is mounted, in the event of contact with a curb or the like. The present loosely mounted stabilizer cannot transfer damage to the vehicle structure, due to its longitudinal, lateral, and vertical play.

U.S. Pat. No. 5,181,734 issued on Jan. 26, 1993 to Terry L. Brown, titled "Adjustable Gravel Shield For A Towed Boat," describes a lateral bar pivotally attached to a trailer tongue, with a pair of mud flaps depending from the bar. The ends of the bar are also secured to the back of the towing vehicle by elastic cords, thus holding the bar and mud flaps generally parallel to the back of the towing vehicle as the bar translates from side to side as the trailer tongue pivots arcuately during turning maneuvers. The Brown assembly places the mud flaps between the wheels of the towing vehicle and the trailer being towed, regardless of the angle of the trailer relative to the towing vehicle, but does nothing to control any forward or rearward movement of the flaps themselves.

U.S. Pat. No. 5,816,617 issued on Oct. 6, 1998 to Nan Huang, titled "Adjustable Mud Flap Holder," describes an arrangement more closely related to the device of the '908 U.S. Patent to Betts, discussed further above, than to the present invention. The Huang device comprises a pair of rigidly mounted rods, each bent double to form a narrow channel therebetween. A transverse retaining member is adjustably clamped to the two rods for adjustment up and down the length of the mud flap retained thereby. However, the Huang assembly cannot move if the vehicle strikes a curb or the like, and will thus be bent or otherwise damaged, or transfer damage to the vehicle. The loosely mounted stabilizer of the present invention, precludes such damage by allowing movement in any of three dimensions. Moreover, the present stabilizer completely surrounds the brush or flap, unlike the Huang device which only partially surrounds the flap.

U.S. Pat. No. D-308,958 issued on Jul. 3, 1990 to Ronald A. Knox, titled "Vehicular Mudflap," illustrates a design for a flap and stabilizer similar to the devices of the '908 and '617 U.S. Patents respectively to Betts and Huang, discussed further above. However, the Knox device cannot be adjusted vertically, as can the present stabilizer, and does not extend completely around the flap, unlike the present completely surrounding stabilizer. Moreover, it appears from the Figure Descriptions of the Knox device, that the portion of the stabilizer extending completely across the flap is to the front side of the flap (i.e., toward the tire), rather than to the back, where the greatest control would normally be required.

Finally, British Patent Publication No. 2,269,349 published on Feb. 9, 1994 to Roger Kay, titled "Devices For Controlling Spray From Vehicles," describes a relatively small shield having an arm for mounting to the axle of a vehicle and extending behind the vehicle tire. Kay notes that the lower or deflector portion may be resilient (page 1, line 18), but the remainder of the structure is rigid, and Kay does not provide any means for controlling movement of the lower resilient deflector portion. In another embodiment, the support structure is attached to the vehicle structure behind the wheel(s), with vertical motion being controlled by a master and slave hydraulic cylinder system actuated by relative motion between the vehicle structure and axle. Such relative motion compresses or extends both cylinders simultaneously, thus raising the mud flap as the rear of the vehicle is lowered, and lowering the flap when the rear of the vehicle rises. However, this vertical compensation cannot provide for clearance or resilience when the structure strikes a curb, parking lot bumper, etc. during a backing maneuver, and would thus be damaged, or transfer damage to the vehicle, in such conditions. Moreover, the rest of the mounting is rigid, and cannot provide lateral or longitudinal compliance under any conditions, whereas the present loosely mounted stabilizer is free to move longitudinally, laterally, and vertically.

None of the above inventions and patents, taken either singly or in combination, is seen to describe the instant invention as claimed.

SUMMARY OF THE INVENTION

The present invention comprises a stabilizer for flexible guards such as flexible brushes and flaps, as in mud flaps extending from the rear of motor vehicles, flap type cleaning cloths used in automated "brushless" car washes, and for control of material on conveyor belts and the like. The present stabilizer comprises a rigid structure which completely surrounds the flap(s) or brush(es), with the rigid structure being loosely and flexibly suspended from a structure above the depending flap(s) or brush(es). The rigid portion of the device is preferably formed of a relatively light weight material, such as polyvinyl chloride (PVC) plastic pipe or the like, but may be formed alternatively of a wide variety of elongate materials, such as electrical metal tubing (EMT), metal plumbing pipe, and/or T-sections, square sections, channels, and other shapes of steel, aluminum, and/or other metals or materials. Lighter materials may be weighted, if so desired, to adjust the resonant frequency as desired.

The rigid assembly is flexibly and adjustably suspended to surround the guard, as by chains or other suitable means attached to each end thereof. An additional attachment or attachments may be used at the centerpoint of the rigid assembly for additional security, if desired. The use of chains or equivalent attachments permits the rigid assembly to swing forwardly and rearwardly, to either side, and to be displaced upwardly in the event the assembly strikes an immovable object, such as if the vehicle to which the present assembly is attached, backs into a curb or the like.

Accordingly, it is a principal object of the invention to provide an improved stabilizer for flexible guards, such as mud flaps, brushes, and the like, for loosely and flexibly suspending from an overlying structure to surround completely the flexible guard and thereby control flexure and movement of the guard.

It is another object of the invention to provide an improved stabilizer for flexible guards which is particularly adapted for the control of motion of mud flaps or brushes on a motor vehicle, with the device including a rigid structure surrounding the guard, with the rigid structure being loosely and flexibly suspended from an overlying structure supporting the guard and permitting longitudinal, lateral, and vertical motion of the rigid portion for compliance in the event that an immovable object is struck by the vehicle.

It is a further object of the invention to provide an improved stabilizer for flexible guards which may be formed of polyvinyl chloride plastic tubing or pipe, or other non-metallic or metallic elongate structural material as desired.

An additional object of the invention is to provide an improved stabilizer for flexible guards including vertical adjustment means therefor.

Still another object of the invention is to provide an improved stabilizer for flexible guards which may include weight means therewith for adjusting the periodic frequency of the device.

Yet another object of the invention is to provide a improved stabilizer for flexible guards including width adjustment means.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a stabilizing device 10 for use with various types of relatively thin, flexible brushes and flaps of material, such as used to reduce splash and scatter from the rear tires of motor vehicles, for controlling spray in a car wash, controlling material being conveyed on a conveyor belt, etc. All such brushes and flaps are related in that they comprise relatively thin and flexible elements, either in sheet or strand form, and are compliant to pass over any hard, solid objects which they may encounter during operation. As such devices are related in structure and to a certain extent in function in that they serve to guard the nearby environment from spray and scattered materials from relatively moving objects (tires, conveyors, etc.), they are all termed "guards" for the purposes of the present disclosure, and referred to as such throughout the present disclosure.

Figure 1:
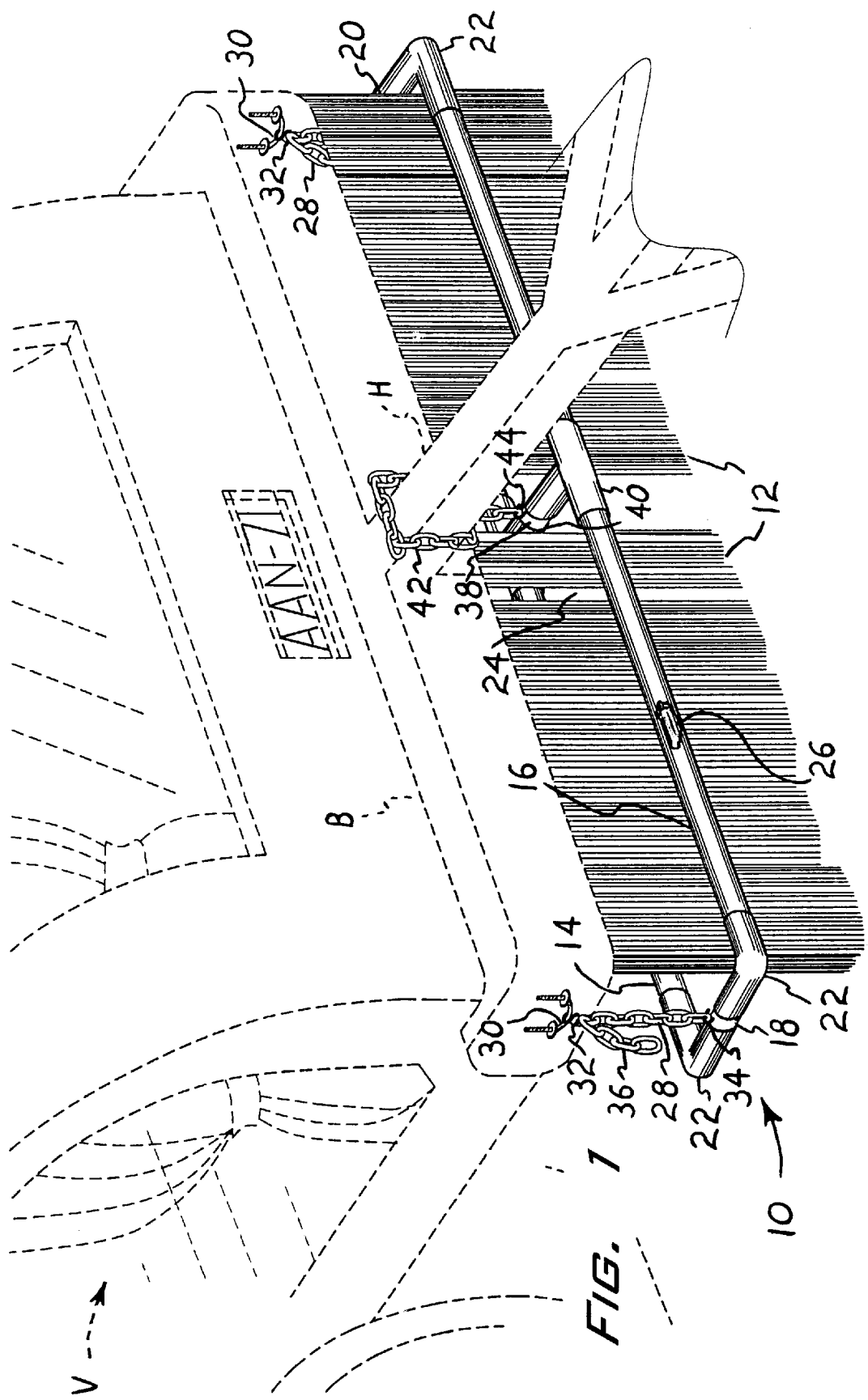
FIG. 1 is an environmental perspective view of the present stabilizer device, showing its installation on a recreational vehicle for control of the brush type flap extending therefrom.

FIG. 1 illustrates the present stabilizer 10 installed upon the rear bumper B of a recreational vehicle V, for controlling the movement of a brush type guard 12 depending from the lower rear portion of the vehicle V for controlling the scatter and spray of liquid and solid particles from the rear tires. Such brush type guards 12 are known in the art, and may extend across the entire lower rear portion of the vehicle V, or may be installed only behind the rear wheels and tires. Regardless of the extent of the brush type guard 12, the present guard retainer 10 reduces oscillation and wind blown movement of the guard 12, thus greatly reducing damage to towed or following vehicles from thrown particles.

The stabilizer 10 basically comprises an elongate guard retainer, preferably extending completely across the width of the vehicle V to completely encompass the guard 12. The guard retainer is formed of rigid materials, and includes a front element 14, an opposite rear element 16, and opposite first and second end elements 18 and 20. These elements 14, 16, 18, and 20 are connected by a series of elbows 22 to form a continuous structure, with the structure defining a guard passage 24 therethrough and completely surrounding the flexible guard 12 as shown clearly in FIG. 1 of the drawings.

The guard retainer may be formed of a variety of different types of material as desired, such as aluminum or steel tubing, etc. Other hollow tubular materials may be used as desired, such as polyvinyl chloride pipe, electrical metal tubing (EMT), conventional iron pipe as used in the plumbing industry, etc. These materials are differently weighted from one another, with iron pipe being considerably heavier than PVC and EMT pipe and aluminum tubing. Such weight may provide certain advantages in that the present guard retainer is pendulously suspended from an overlying structure (rear bumper, etc.), and different masses or weights for the device may beneficially effect the movement of the device under various conditions. It should be noted that other materials (e.g., metal and plastic tee, angle, and channel extrusions, etc.) may be used, but the use of hollow tubular material permits ballast to be added to the interior of the tubes or pipes, as shown by ballast 26 in the broken away section of the rear element 16 in FIG. 1.

The rigid guard retainer portion of the present stabilizer 10, comprising elements 14, 16, 18, 20, and 22, is loosely and pendulously suspended from an overlying structure such as the rear bumper B of the vehicle V, as shown in FIG. 1. The use of flexible suspension elements for pendulously and loosely suspending the rigid structure, permits longitudinal, lateral, and vertical movement of the guard retainer for compliance when the guard retainer is struck, e.g., when the vehicle V encounters a particularly deep pothole, or backs into a parking lot bumper or curb, etc., for precluding damage to the guard retainer and any overlying structure from which the guard retainer is suspended, as the retainer is free to move and cannot transmit impact loads to its attachment structure.

Preferably, the flexible suspension elements used for the attachment of the rigid structure of the guard retainer to the vehicle V, comprise chains 28 secured to and supporting the opposite first and second end elements 18 and 20 of the rigid structure. These chains 28 may be secured beneath the rear bumper B of the vehicle V by a clevis 30 or other anchor means permanently and securely attached (e.g., screws, etc.) to the underside of the rear bumper B, with an S-hook 32 or other suitable means linking each chain 28 to the clevis 30. An eye bolt 34 or other suitable attachment is secured to or through each end element 18 and 20, with one of the chain links being installed therein. Other alternative attachment means may be used as desired.

Figure 2:
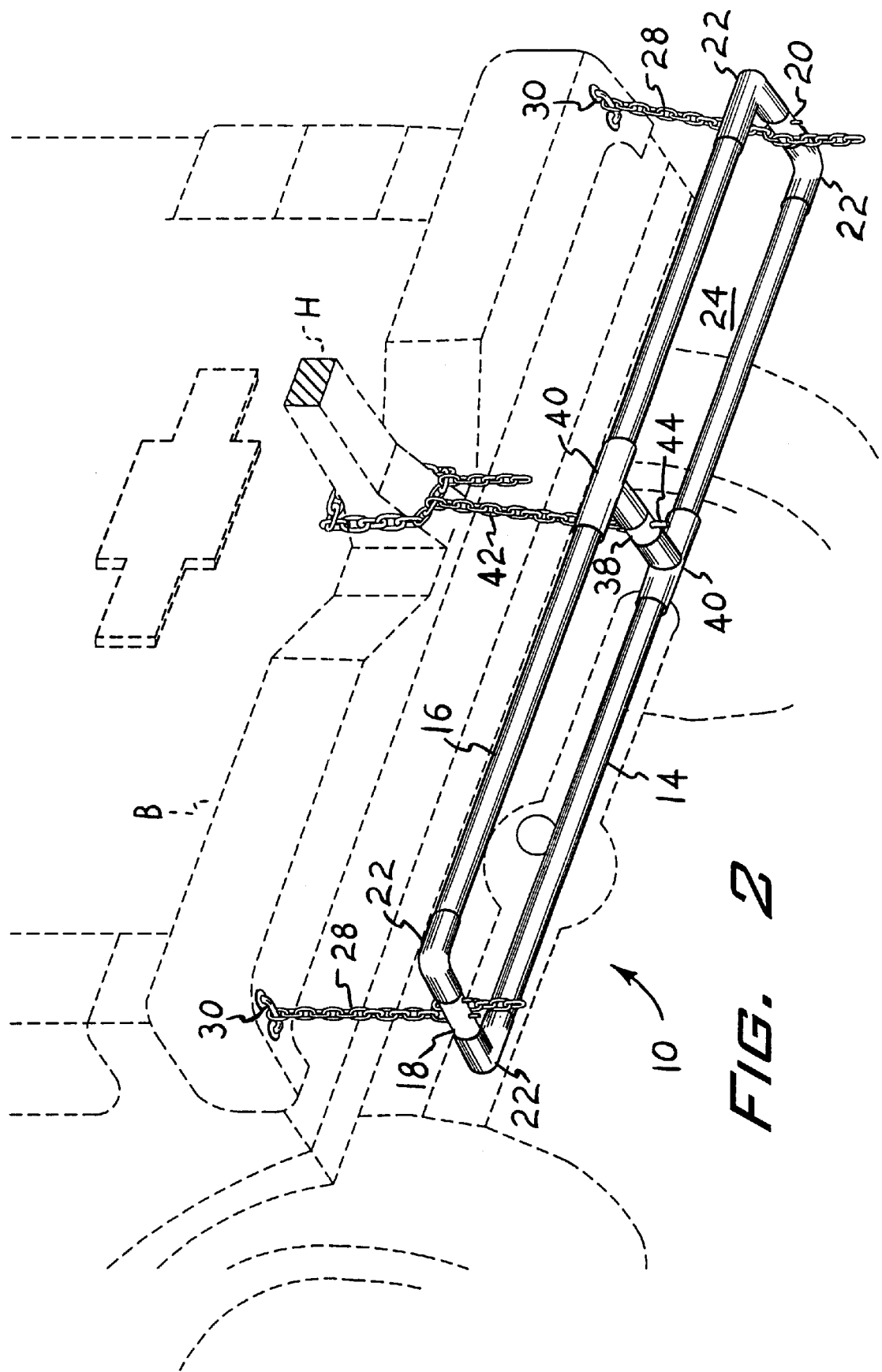
FIG. 2 is a bottom and rear perspective view of the stabilizer device of FIG. 1, showing further details thereof.

The use of chains 28 also provides for the adjustment of the height of the rigid guard retainer portion of the present brush and flap stabilizer 10. For example, some additional chain length may be provided, with the additional free end 36 of the chains 28 permitting the guard retainer to be lowered, if so desired. The vertical adjustment of the device is easily accomplished by opening the S-hooks 32 slightly, and passing the open end of the S-hook through the desired link in the free end 36 of the chain 28 (or through a link in the chain 28 to raise the device), as desired. Alternatively, the adjustment may be made at the lower end of the chain 28 and its eye bolt attachment with the end elements 18 of the guard retainer, as shown in FIG. 2 of the drawings. Other chain attachment means (conventional snap hooks, etc.) may be used as desired.

Figure 3:
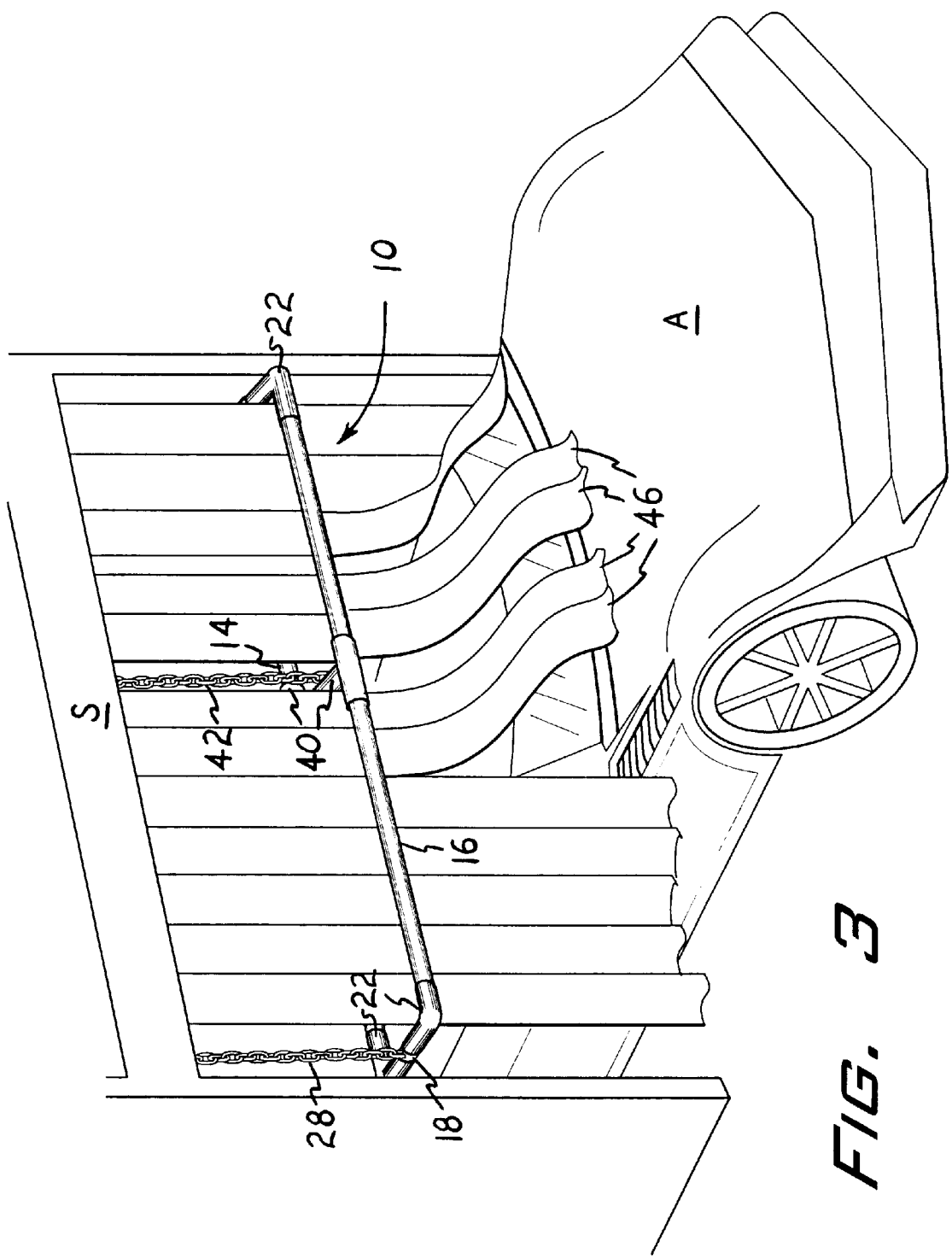
FIG. 3 is an environmental perspective view of the present stabilizer device in a car wash installation, for control of the cleaning cloth flaps of the car wash.

It will be noted that an additional centrally disposed crossmember element 38 is provided in the guard retainer of FIGS. 1 through 3. This central element 38 is joined to the forward and rearward elements 14 and 16 by tee fittings 40, and provides an additional element of support for the device. A central chain 42 secures to a central eye bolt 44 or other suitable attachment fitting secured to the central element 38, with the upper portion of the chain 42 being wrapped and secured about the trailer hitch H which extends rearwardly from the vehicle V. In the event that the vehicle V has no hitch, then the central chain 42 may be secured beneath the central part of the bumper B by the same or equivalent means used to secure the ends of the device to the bumper.

While FIGS. 1 and 2 illustrate the present stabilizer 10 being used to retain and stabilize a brush type mud guard 12 suspended from the rear of a motor vehicle V, it will be seen that the present invention may be applied to many other areas in which similar thin, flexible brush and flap type guards are used. FIG. 3 illustrates the use of the present stabilizer 10 in a car wash environment, where the device is suspended from an overhead structure S and serves to control the movement of the flexible guard flap elements 46 which are used to control water spray and to provide some frictional cleaning contact with a vehicle, such as the automobile A, passing through the car wash system. It will be noted that the various elements comprising the stabilizer 10 of FIG. 3, are essentially identical to those illustrated and described in FIGS. 1 and 2, with only the type of guard (i.e., multiple flap elements 46) and the environment differing.

Figure 4:
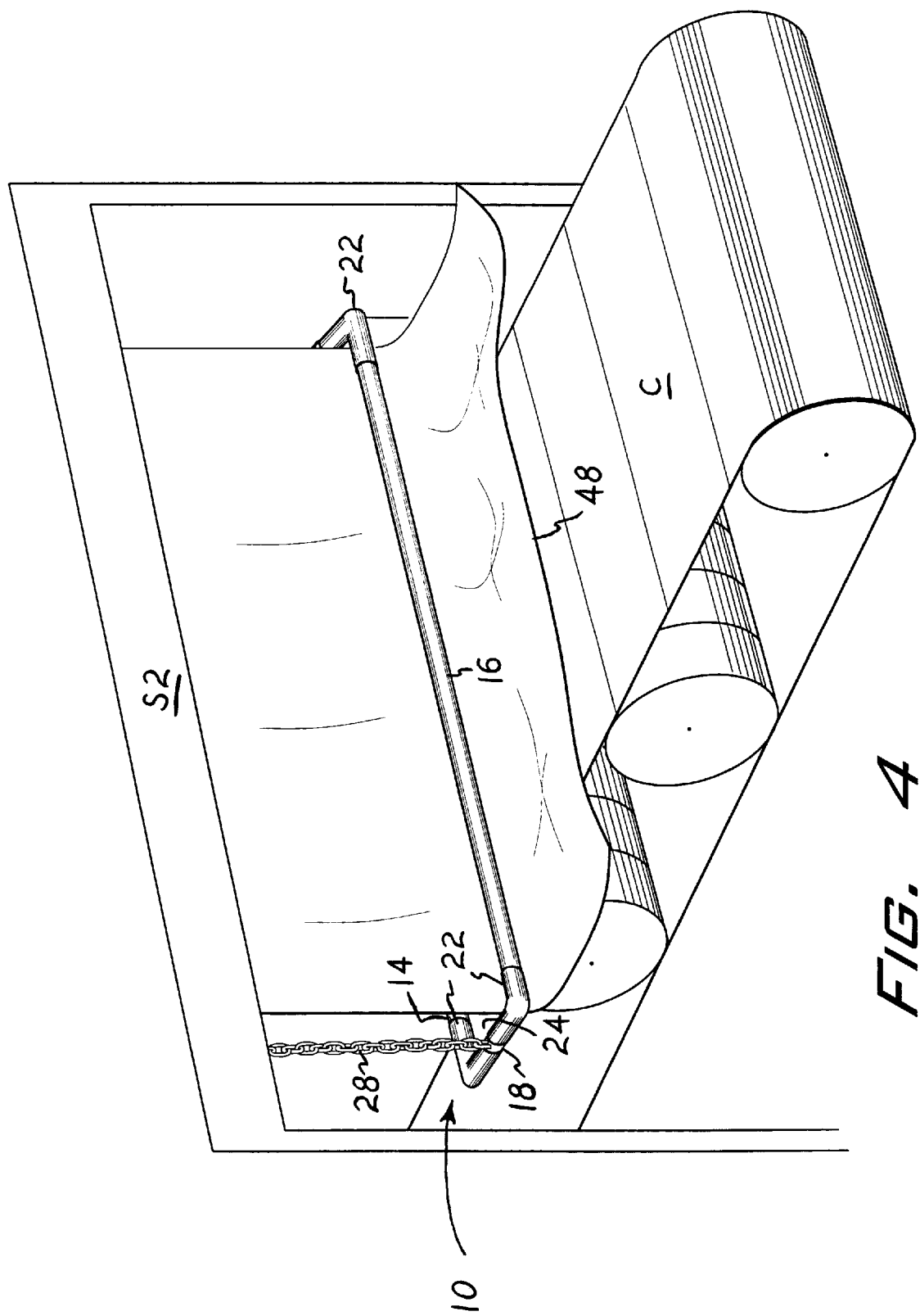
FIG. 4 is an environmental perspective view of another embodiment of the present stabilizer device in a conveyor installation, for controlling a conveyor flap.

FIG. 4 illustrates another operating environment for the present brush and flap guard stabilizer 10, in which the device is installed in a conveyor line. The stabilizer 10 is suspended from an overhead structure S2, with the guard retainer comprising components 14 through 22 defining a guard passage 24 and completely surrounding the single piece, continuous flap type guard 48 which bears against the underlying conveyor belt C. As the single piece flap type guard 48 spans essentially the entire width of the guard passage 24, it will be seen that no central crossmember is provided for the stabilizer 10 of FIG. 4. Otherwise, the stabilizer 10 of FIG. 4 is identical to the stabilizers 10 of other Figures.

Figure 5:
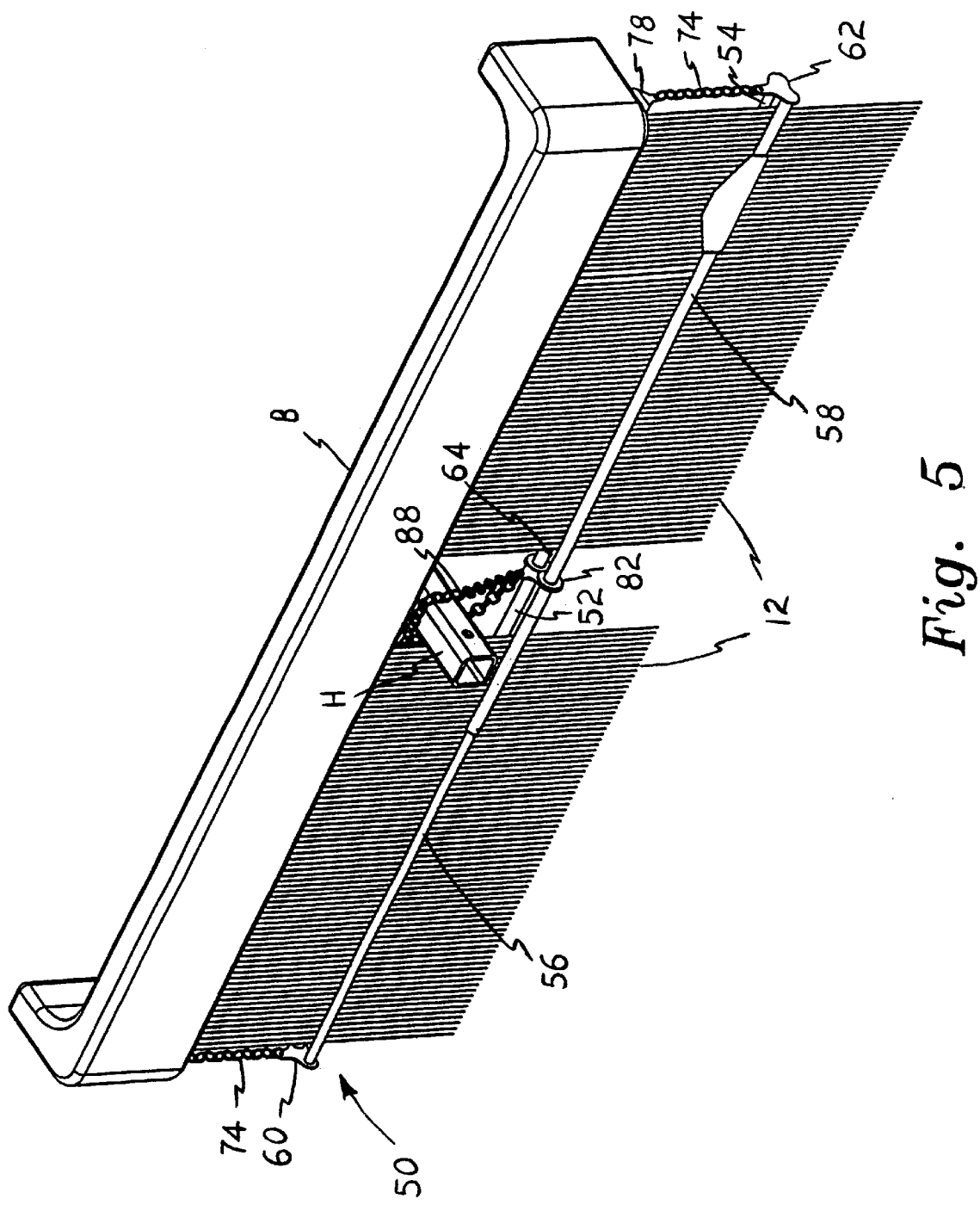
FIG. 5 is a perspective view of a further embodiment of the present brush stabilizer having width adjustment means.
Figure 6:
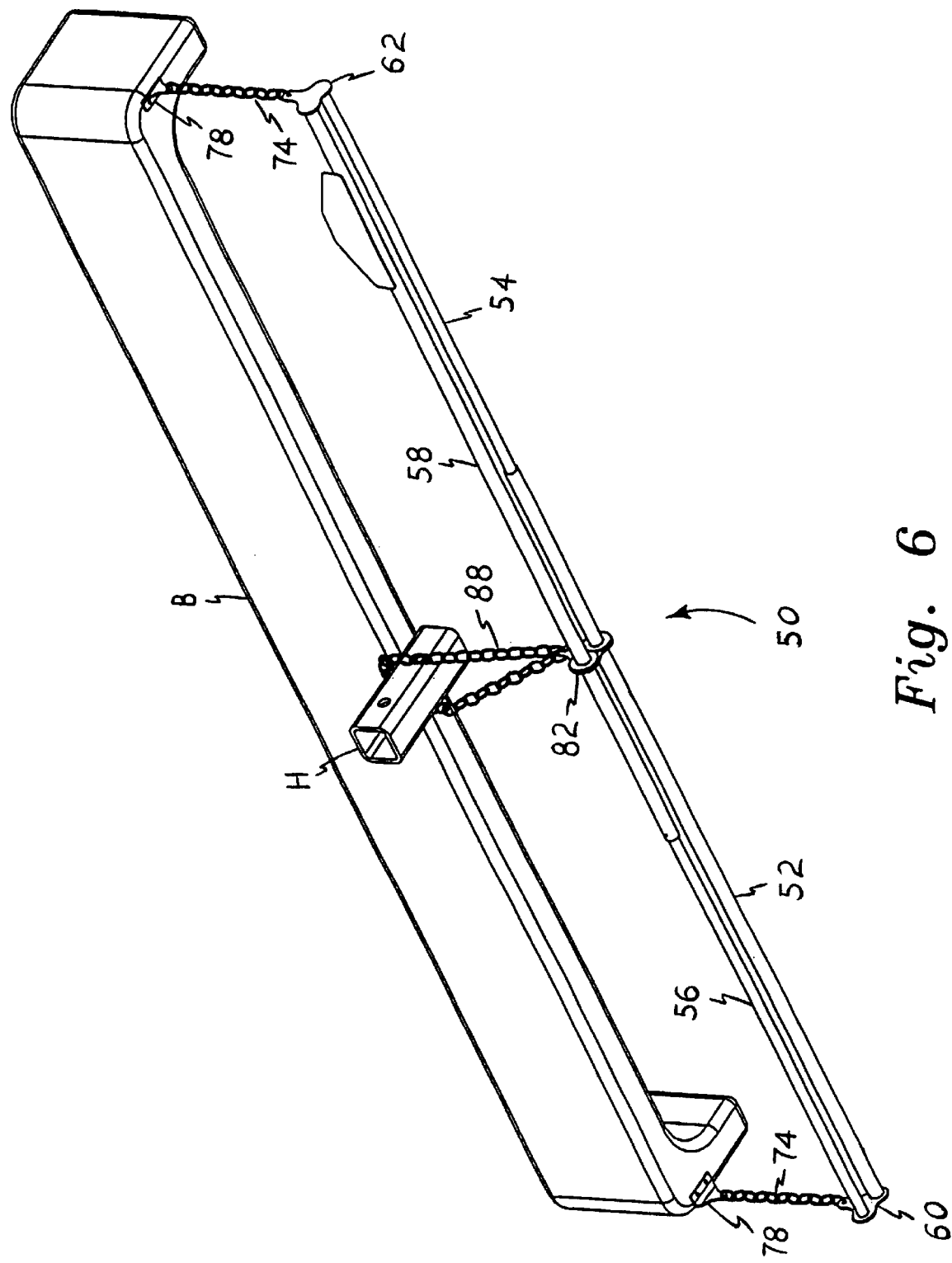
FIG. 6 is a lower perspective view of the stabilizer of FIG. 5 with the mud guard brush removed, showing further details.

FIGS. 5 through 9 of the drawings illustrate a further embodiment of the present brush and flap stabilizer, designated as stabilizer 50. The stabilizer 50 is adaptable for use with flexible brushes or flaps depending from vehicle bumpers, such as the brush type guard 12 depending from the bumper B shown in FIG. 5 of the drawings. The stabilizer assembly 50 of FIGS. 5 and 6 is particularly well suited for use with various types of vehicles, as it provides means for adjusting the width of the device to accommodate different vehicle widths, as discussed in detail further below. However, it will be seen that it is readily adaptable to other environments as well, such as the car wash and conveyor usages illustrated respectively in FIGS. 3 and 4 of the drawings and discussed further above.

The stabilizer assembly 50 of FIGS. 5 and 6 basically comprises an elongate guard retainer, preferably extending completely across the width of the vehicle and bumper B to completely encompass the guard 12. The guard retainer is formed of rigid materials, and includes a two piece front element 52 and 54 (more clearly shown in FIG. 60, an opposite two piece rear element 56 and 58, and opposite first and second end elements 60 and 62. Rather than linking the front and rear elements with the end elements by means of separate connectors, as in the case of the stabilizer assemblies of FIGS. 1 through 4, the end elements 60 and 62 are attached (welded, mechanically or adhesively attached, etc.) directly to their respective front and rear elements 52 through 58 to form a closed structure defining a guard passage 64 therethrough to completely surround the flexible guard 12 as shown clearly in FIG. 5 of the drawings.

The stabilizer 50 of FIGS. 5 and 6 differs from the stabilizer 10 of FIGS. 1 through 4 primarily in that the stabilizer 50 includes means for adjusting the width of the device. As vehicles with which the stabilizer 50 may be used come in many different widths, it will be seen that a number of different stabilizers would have to be provided if no width adjustment is provided. The present adjustable width stabilizer 50 enables a single device to be manufactured which is adjustable to fit all widths of vehicles, and further to allow the owner of the device to transfer it from one vehicle to another, in the event he or she sells a vehicle and purchases another of a different width.

The forward and rearward element assemblies of the stabilizer 50 of FIGS. 5 and 6, each comprise a pair of telescoping tubes, respectively 52 and 54 for the front element, and 56 and 58 for the rear element. It will be seen that in the example of FIGS. 5 and 6, that the first or left hand forward member 52 has a slightly larger diameter than the corresponding second or right hand forward member 54, with the second member or element adjustably telescoping into the first member or element 52. Conversely, the second or right hand rearward member or element 58 has a larger diameter than the first or left hand rearward element 56, with the first element 56 telescoping into the second element 58. It will be seen that these relative telescoping elements may be reversed, if desired, or both of the larger diameter elements 52, 56 placed to one or the other side of the assembly, as desired.

Means may be provided for locking the relative extensions of the various elements to fix the overall width of the stabilizer 50, if so desired, e.g., a series of conventional concentric passages (not shown) through the overlapping portions of each forward and rearward assembly, with a bolt, pin, etc. adjustably placed through a set of the aligned passages as desired to lock the extension and width of the device as desired. It will be seen that only a single such width locking means is required, as the fixed adjustment of one pair of elements (front or rear) automatically retains the opposite pair of elements at the same width, due to the end plates 60 and 62 which secure the elongate forward and rearward elements together.

Figure 7:
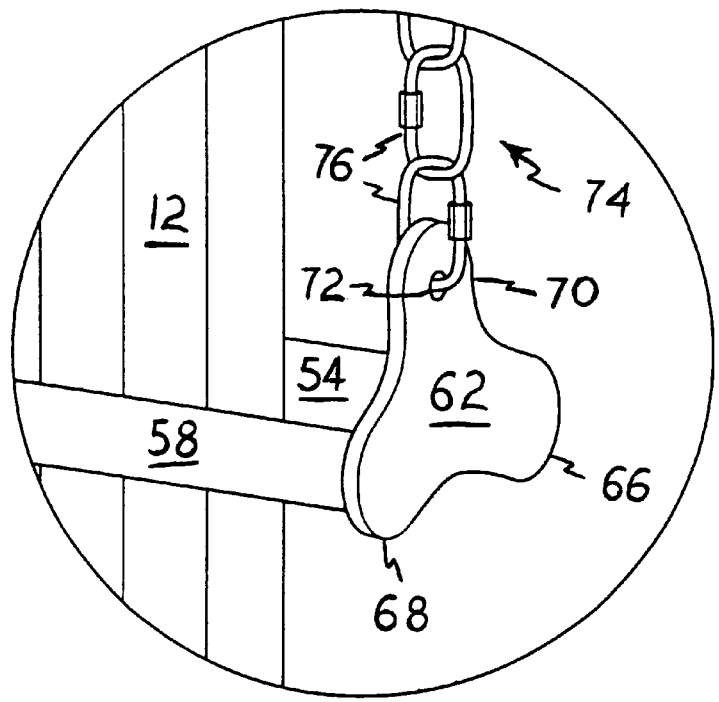
FIG. 7 is a detail perspective view of the lower end attachment means for the stabilizer assembly of FIGS. 5 and 6, showing the height adjustment means provided.

FIG. 7 provides a detailed illustration of the second end plate or element 62, with it being understood that the first end plate 60 is essentially identical except for its mirror image installation to the stabilizer assembly. The end element 62 includes depending forward and rearward ears or lugs, respectively 66 and 68, to which the second forward and rearward elements 54 and 58 are permanently affixed. An upper lug or ear 70 includes a hole or passage 72 therethrough, permitting the end element 62 and its attached forward and rearward elements 54 and 58 to be suspended from an overlying structure, e.g., a vehicle bumper.

Figure 8:
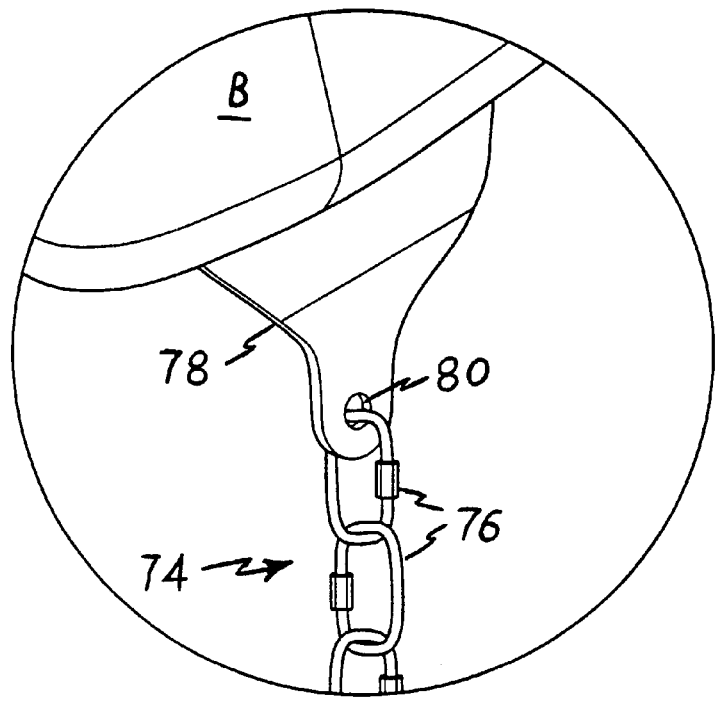
FIG. 8 is a detail perspective view of the upper end attachment means for the stabilizer assembly of FIGS. 5 and 6, showing the height adjustment provided at that attachment point.
Figure 9:
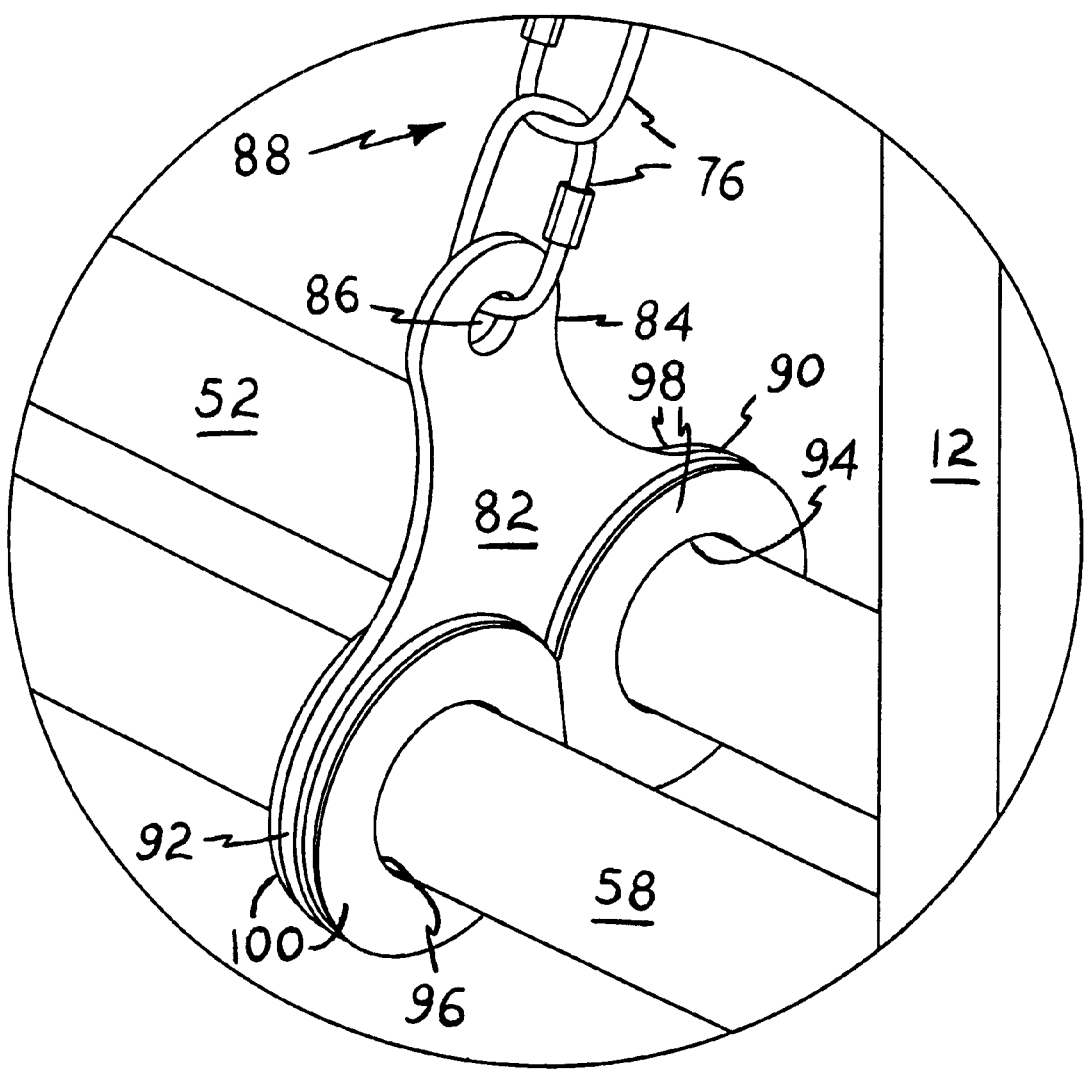
FIG. 9 is a detail perspective view of the central suspension means for the stabilizer assembly of FIGS. 5 and 6.

The end elements 60 and 62, and the forward and rearward elements 52 through 58 extending therebetween, are suspended from a flexible line having an adjustable length, such as the adjustable length chain 74 shown in FIGS. 5 through 8 of the drawings. The chain 74 includes one or more openable links 76, such as the carabiner type links 76 shown in FIGS. 7 and 8. These links have an open side with a threaded end component on one side of the gap, and a matingly threaded fitting which engages the end component threads. Unscrewing the fitting from the threaded end component opens the gap between the components to allow the link 76 to be removed from or added to another device. FIGS. 7 and 8 illustrate chains 74 formed of a series of such openable links 76, allowing links to be added or removed as desired to adjust the length of each chain 74. Alternatively, a single openable link 74 may be provided and placed in the chain to gather any of a number of permanently closed links as desired to adjust the chain length.

The upper end of each end chain 74 attaches to an attachment bracket 78, which in turn attaches conventionally (bolts, etc.) to a vehicle bumper B or other overlying structure, generally as shown in FIG. 8. Each bracket 78 includes a passage 80 therethrough, through which an openable chain link 76 may be passed to suspend the guard retainer from the overlying structure. As in the case of the second lower end attachment plate 62 illustrated in detail in FIG. 7 of the drawings, it will be understood that the two upper end attachment brackets 78 are essentially identical, and differ only in their mirror image mounting to the overlying structure.

The stabilizer 50 of FIGS. 5 and 6 may also include medial suspension means as well, as in the case of the guard 10 illustrated in FIGS. 1 through 4 of the drawings. In the case of the stabilizer 50, an adjustably positionable medial support bracket 82 is provided along the general center of the device. The upper portion of the bracket 82 comprises a lug 84 with a support attachment hole or passage 86 therethrough, to which a split link 76 of a chain 88 may be attached. The opposite end of the central chain 88 may be wrapped about the central receiver hitch socket H of the vehicle, as shown in FIGS. 5 and 6, or otherwise secured to the bumper or other overlying structure. The central chain 88 is adjusted to adjust the height of the central portion of the stabilizer 50 in the same manner as that described further above for adjusting the height of ends of the stabilizer 50, i.e., removing or adding one or more links 76 or adjustably capturing or releasing one or more closed links in a single openable link 76.

Each of the lower lugs or ears 90 and 92 of the central suspension bracket 82 includes a guard element passage therethrough, respectively 94 and 96. The forward and rearward elements 52 and 58 (i.e., the elements having the larger diameters, into which the other two elements 54 and 56 fit) pass respectively through these two passages 94 and 96. A grommet or sleeve, respectively 98 and 100, is inserted into each of the holes or passages 94 and 96 to cushion the respective stabilizer members 52 and 58 as they pass through the two central bracket passages 94 and 96, and to provide a larger bearing area for the two stabilizer members 52 and 56 to reduce wear thereto. As the tubes or members 52 and 56 are free to slide through their respective holes 94, 96 and grommets or sleeves 98, 100, the two telescoping tube assemblies 52, 54 and 56, 58 may be extended or retracted to adjust the overall width of the guard 50, without any additional need to reposition the members 52 and 58 relative to the central support bracket 82.

In summary, the present stabilizer embodiments for flexible brushes, flaps, and similar relatively thin and pliable guard type devices, provides a much needed improvement in the control of such devices to prevent or greatly reduce their movement, thereby reducing the scatter of gravel, sand, and other particulate matter, spray, etc. which may be kicked up by tires or other relatively moving objects.

While the present stabilizer embodiments may be applied to a wide number of different operating environments, it is particularly valuable in the field of motor vehicles, for the control of brush and flap type guards as installed behind the rear wheels of many larger vehicles. Not only does the present stabilizer reduce damage to the finish and windshields of following vehicles by means of the greater control of the mud guards of the vehicle upon which it is installed, but it also greatly reduces damage to the finish of any vehicles or other objects being towed directly behind a vehicle equipped with the present stabilizer. Also, by better controlling the mud guards of a vehicle, the present stabilizer assists in keeping the rear of the vehicle in a cleaner condition as well.

The various embodiments of the present stabilizer device may be constructed of a wide variety of elongate materials, as noted further above, or even cast or molded as a single, unitary piece of appropriate material. The rigid guard retaining element may be painted or otherwise colored to provide an unobtrusive appearance, and/or may be rubberized or otherwise coated with a resilient finish, particularly in the case of metal or harder materials, to reduce damage due to sand, gravel, etc. which is kicked up by the rear wheels of the vehicle. The height and width adjustment means described above for the present stabilizer invention, provide even more versatility for the device for installation in a wide variety of different vehicles and other environments.

Accordingly, the various embodiments of the present stabilizer device invention will find widespread acceptance among people who own or drive larger vehicles equipped with mud guard brushes, flaps, or the like, for controlling the motion of such guards and thereby controlling the amount of spray and particulate matter which might otherwise bypass the guards if left uncontrolled. The present stabilizer will also find use in various other environments where guard flaps, brushes, and the like are used, as in car washes, conveyor systems, etc., and will be much appreciated by the owners and operators of such systems.

It is to be understood that the present invention is not limited to the embodiments described above, but encompasses any and all embodiments within the scope of the following claims.

I claim:

1. A stabilizer for a flexible guard, comprising:

a rigid, elongate guard retainer;

said guard retainer having a front element, a rear element opposite said front element, a first end element, a second end element opposite said first end element, and a generally centrally disposed element extending between said front element and said rear element;

each said element being interconnected to form a continuous structure defining a flexible guard passage therethrough for completely surrounding the flexible guard; and suspension means attached to at least each said end element of said guard retainer for suspending said guard retainer from an overlying structure and surrounding the flexible guard for precluding excessive forward and rearward motion thereof, said suspension means further including attachment to said centrally disposed element.

2. The stabilizer according to claim 1, wherein said suspension means comprises plural flexible suspension lines for pendulously suspending said guard retainer from an overlying structure and permitting longitudinal, lateral, and vertical movement of said guard retainer for compliance when said guard retainer is struck, for precluding damage to said guard retainer and the overlying structure from which said guard retainer is suspended.

3. The stabilizer according to claim 1, wherein said suspension means comprises chains.

4. The stabilizer according to claim 1, wherein said suspension means further includes vertical adjustment means for adjusting the height of said guard retainer.

5. The stabilizer according to claim 1, wherein said guard retainer further includes ballast weight means.

6. A stabilizer for a flexible guard, comprising:

a rigid, elongate guard retainer;

said guard retainer having ballast weight means, a front element, a rear element opposite said front element, a first end element, and a second end element opposite said first end element;

each said element being interconnected to form a continuous structure defining a flexible guard passage therethrough for completely surrounding the flexible guard; and suspension means attached to at least each said end element of said guard retainer for suspending said guard retainer from an overlying structure and surrounding the flexible guard for precluding excessive forward and rearward motion thereof.

7. The stabilizer according to claim 6, wherein said suspension means comprises plural flexible suspension lines for pendulously suspending said guard retainer from an overlying structure and permitting longitudinal, lateral, and vertical movement of said guard retainer for compliance when said guard retainer is struck, for precluding damage to said guard retainer and the overlying structure from which said guard retainer is suspended.

8. The stabilizer according to claim 6, wherein said suspension means comprises chains.

9. The stabilizer according to claim 6, wherein said suspension means further includes vertical adjustment means for adjusting the height of said guard retainer.

10. The stabilizer according to claim 6, wherein said guard retainer further includes a generally centrally disposed element extending between said front element and said rear element, with said suspension means further including attachment to said centrally disposed element.

11. A stabilizer for a flexible guard, comprising:

a rigid, elongate guard retainer for precluding excessive forward and rearward motion of the guard;

said guard retainer including ballast weight means, at least a first end element and a second end element opposite said first end element; and flexible suspension means attached to at least each said end element of said guard retainer for pendulously suspending said guard retainer from an overlying structure and permitting longitudinal, lateral, and vertical movement of said guard retainer for compliance when said guard retainer is struck, for precluding damage to said guard retainer and the overlying structure from which said guard retainer is suspended.

12. The stabilizer according to claim 11, wherein said guard retainer further includes a front element, a rear element opposite said front element, a first end element and a second end element opposite said first end element, with each said element being interconnected to form a continuous structure defining a flexible guard passage therethrough for completely surrounding the flexible guard.

13. The stabilizer according to claim 11, wherein said guard retainer further includes a generally centrally disposed element extending between said front element and said rear element, with said suspension means further including attachment to said centrally disposed element.

14. The stabilizer according to claim 11, wherein said suspension means comprises chains.

15. The stabilizer according to claim 11, wherein said suspension means further includes vertical adjustment means for adjusting the height of said guard retainer.

* * * * *